United States Patent [19]

Susaki et al.

[11] Patent Number: 5,484,026
[45] Date of Patent: Jan. 16, 1996

[54] HANDHELD ELECTROMOTIVE TOOL WITH SENSOR

[75] Inventors: Toshikazu Susaki, Kawasaki; Kyoji Nakamura, Yokosuka, both of Japan

[73] Assignee: Nikon Corporation, Tokyo, Japan

[21] Appl. No.: 115,569

[22] Filed: Sep. 3, 1993

[51] Int. Cl.$^6$ .............................. B25B 21/00; G01C 5/00; G01C 9/00
[52] U.S. Cl. .................................. 173/4; 173/11; 173/21; 173/217; 356/4.01
[58] Field of Search .................................. 173/2, 11, 217, 173/20, 21, 4; 356/4, 152.1, 152.2, 152.3, 375, 399, 400

[56] References Cited

U.S. PATENT DOCUMENTS 4,674,870  6/1987  Cain et al. ................................ 356/4

FOREIGN PATENT DOCUMENTS 3-120374  12/1991  Japan .
4-104514  9/1992  Japan .
4-264211  9/1992  Japan .

Primary Examiner—Rinaldi I. Rada

[57] ABSTRACT

A handheld electromotive tool capable of efficient execution of a floor board and a ceiling board is provided. The tool is used in combination with a beam emitting device for emitting a radiation beam in a reference plane, and is provided with a housing held by an operator. The housing has a work member driven by an electric motor and a photo detector for receiving the radiation beam projected in the reference plane. Output signals indicating positional deviation of the photo detector from the reference plane are generated on the basis of output of the photo detector. Rotation of the motor is controlled as follows. Rotation of the electric motor is stopped when the radiation beam is received at a reference position of the photo detector. The electric motor rotates at high speed until the radiation beam is received in the vicinity of the reference position. The electric motor rotates at low speed from the time the radiation beam is received in the vicinity of the reference position to the time the radiation beam is received at the reference position.

7 Claims, 9 Drawing Sheets

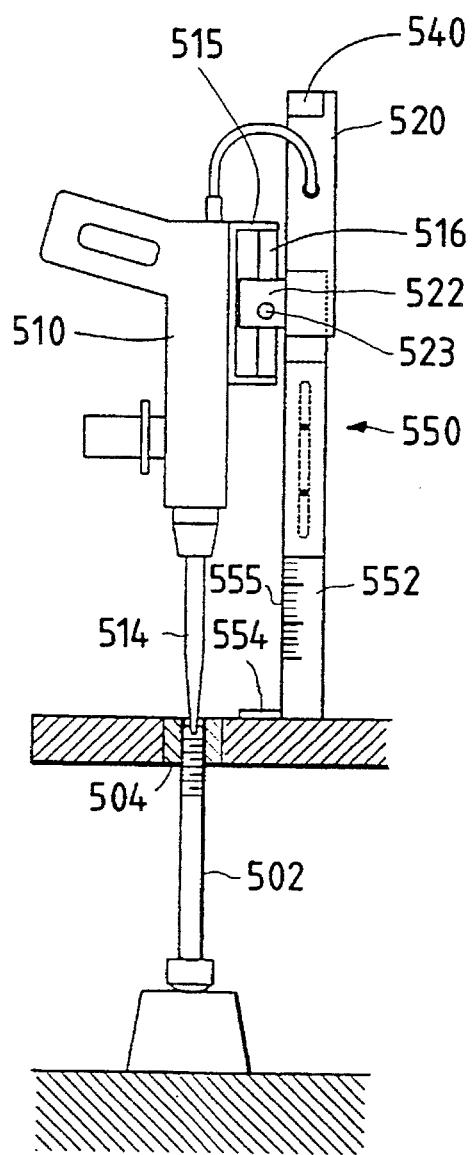
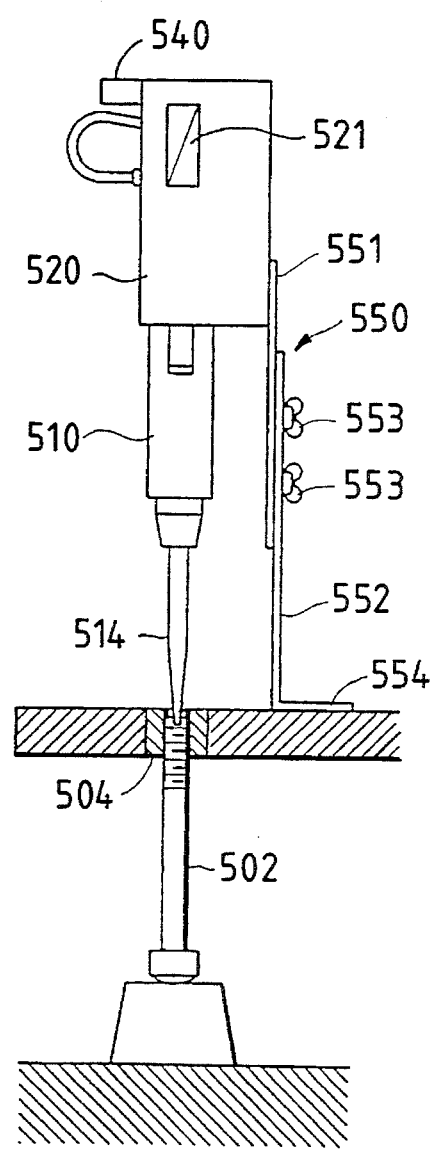
FIG. 9
FIG. 10

HANDHELD ELECTROMOTIVE TOOL WITH SENSOR

BACKGROUND OF THE INVENTION

1. Field of the Invention

The present invention relates to a handheld electromotive tool with a sensor, especially to an electric driven screwdriver having a level sensor.

2. Description of the Related Art

Screwdrivers containing electric motors are generally used in construction fields, and they contribute to improvement of the efficiency in work such as fastening bolts. On the other hand, a method of construction has attracted attention in which ceiling boards and/or floor boards of construction such as buildings and houses are set up so that their levels (heights) can be adjusted if necessary and wirings of electronics and various kinds of apparatus can be installed in the ceiling and or under the floor.

A typical example of a floor board set up according to said method of construction will be described with reference to FIG. 13. Many bearing bolts 2 are revolvably held over the surface of a foundation slab 1, wherein the bearing bolts are arranged substantially perpendicularly. Many nuts 4 which are engaged with corresponding bearing bolts 2 are embedded in a floor board 3. The floor board 3 can be vertically shifted according to the pitch of the screen threads by rotating the bearing bolts 2 one by one with an electric driven driver 5. Similarly, a ceiling board set up according to said method of construction can be vertically shifted by rotating bearing bolts embeddedly provided in a ceiling foundation slab one by one.

In order to set up the floor board 3 horizontally, the amounts of engagement of all the nuts 4 with respective bearing bolts 2 have to be the same and constant. Of course, it is possible to horizontalize the floor board 3 by using a spirit level. But it is highly inefficient to horizontalize the floor board 3 everytime each of many bearing bolts is rotated by the electric driven screwdriver. Also, such work requires skill.

In order to avoid said inconvenience, in Japanese Utility Model Application Laid-open No. 3-120374, technique for controlling rotation of an electric driven screwdriver according to output of a photo detector has been proposed, in which a photo detector for receiving a laser beam rotating in a reference flat plane is mounted on an electric driven screwdriver. According to this prior art, as the electric driven screwdriver is stopped when the laser beam is received as a reference position of the photo detector, the amounts of engagement of all the nuts 4 with respective bearing bolts 2 can be made to be the same and constant. However, as the motor will not stop as soon as the laser beam reaches said reference position, the floor board can be set exactly at the target position only after repeating normal and reverse rotations of the motor several times.

SUMMARY OF THE INVENTION

An object of the present invention is to provide a handheld electromotive tool capable of efficiently horizontalizing a floor board and/or a ceiling board.

Another object of the present invention is to provide a handheld electromotive tool capable of automatic execution in a short time, which can be realized by improving a conventional handheld electromotive tool with a sensor.

The electromotive tool according to the present invention is used in combination with a projector device for emitting a radiation beam in a reference flat plane, and is provided with a housing to be held by an operator. In said housing, there are provided a work member which is driven by an electric motor and a photo detector which receiver the radiation beam projected in the reference flat plane. Also a position transducer means for generating an output signal for indicating positional deviation of said photo detector from the reference flat plane on the basis of the output from the photo detector is provided. Further, a means for stopping the electric motor when the radiation beam is received at a reference position of the photo detector, as well as for controlling the rotating speed of the motor according to the position transducer means so that the electric motor is rotated at high speed until the radiation beam is received in the vicinity of the reference position and that the electric motor is rotated at low speed from that the till the radiation beam reaches the very reference position.

If a box wrench, for example, is attached to a rotation shaft of the electromotive tool and a nut which is engaged with a bolt set up substantially vertically to the horizontal foundation slab or the ceiling foundation slab is rotated with said tool, the electromotive tool itself shifts vertically as the nut is rotated. If there is provided a projector device for emitting a horizontal radiation beam on the foundation slab, the position of the photo detector at which the beam is received changes as the electromotive tool itself shifts.

The control means rotates the electric motor at high speed forwards or reversely so that the laser beam comes nearer to the reference position of the photo detector, switches to low speed rotation when the beam is received in the vicinity of the reference position and steps the motor when the beam reaches the reference position.

In the preferred embodiments according to the present invention, a posture indicator for indicating that the rotation shaft of the electric motor is vertical is provided in the housing of the electromotive tool. The operation can control the positions of the nuts when the motor is stepped so that the heights of these positions are always the same and constant, wherein the operator, while holding the electromotive tool substantially vertically according to the posture indicator, sets up the floor board and/or the ceiling board by operating said electromotive tool.

BRIEF DESCRIPTION OF THE DRAWINGS

FIG. 9 is a front view showing the second embodiment of the electric driven screwdriver according to the present invention.

FIG. 10 is a view of the electric driven screwdriver shown in FIG. 9, seen from rightwards.

DESCRIPTION OF THE PREFERRED EMBODIMENTS

Figure 1:
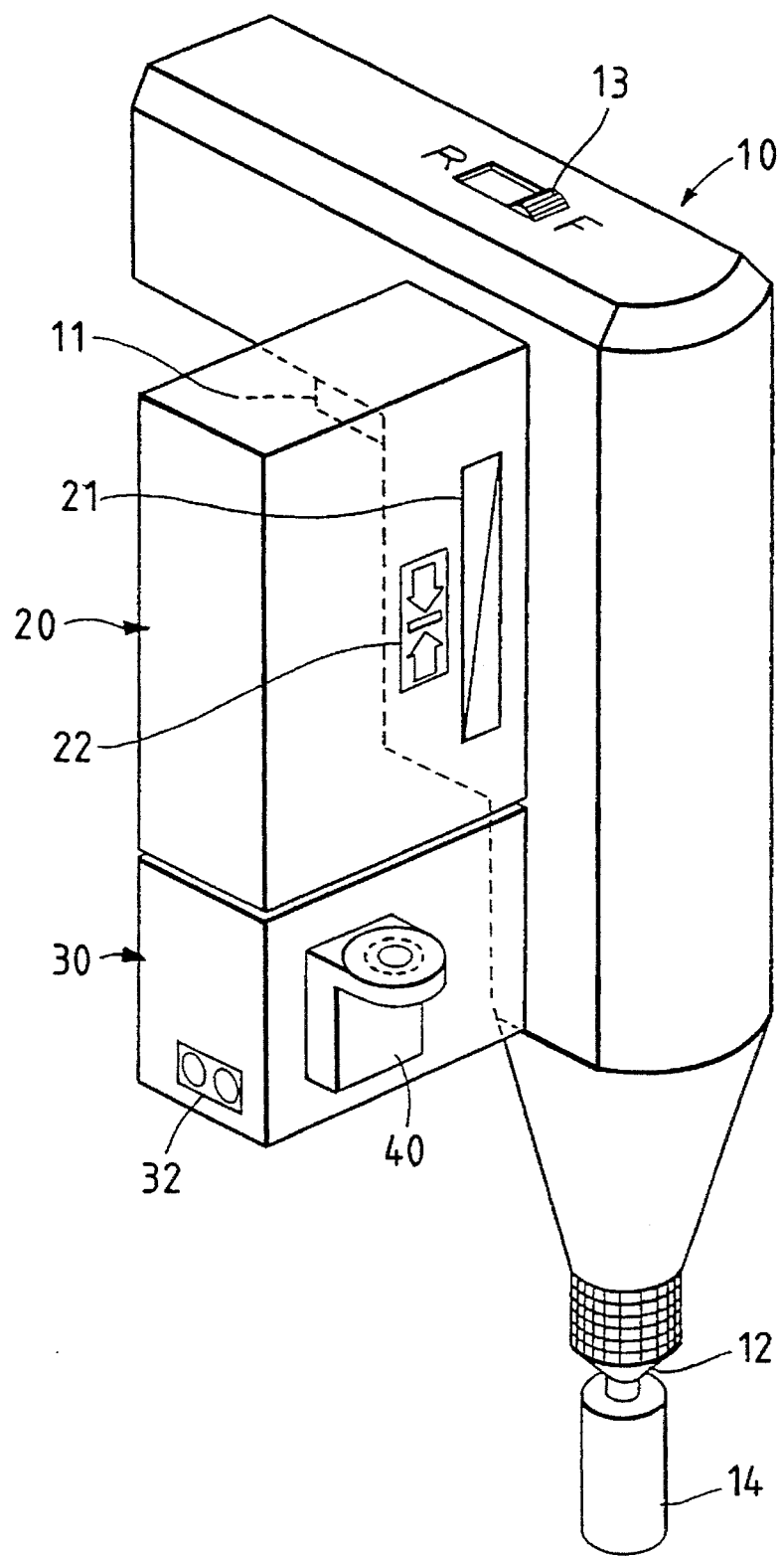
FIG. 1 is a perspective view showing the first embodiment of the electric driven screwdriver according to the present invention.

FIG. 1 shows the appearance of the first embodiment in which the present invention is applied to an electric driven screwdriver, which comprises an electric driven screwdriver main body 10, a position sensor 20 and a control box 30. The electric driven screwdriver main body 10 contains a power circuit, an electric motor, and so on. When a trigger switch 11 provided in a handle is turned on, the electric motor is driven and a chuck 12 at the end of a drive shaft is rotated. The initial direction of rotation of the motor is selected by switching a selector switch 13 for switching forward and reverse rotations.

Figure 2:
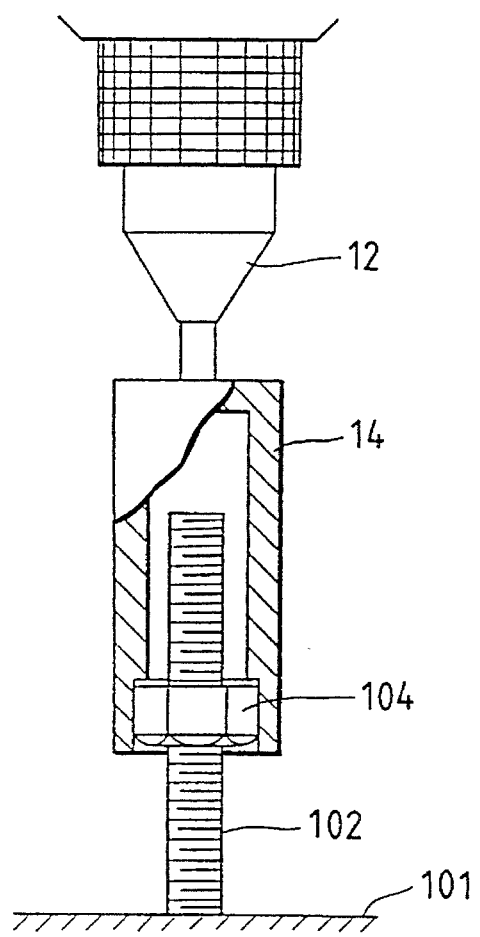
FIG. 2 is a partial cross-sectional view showing engagement of a box wrench and a nut.
Figure 13:
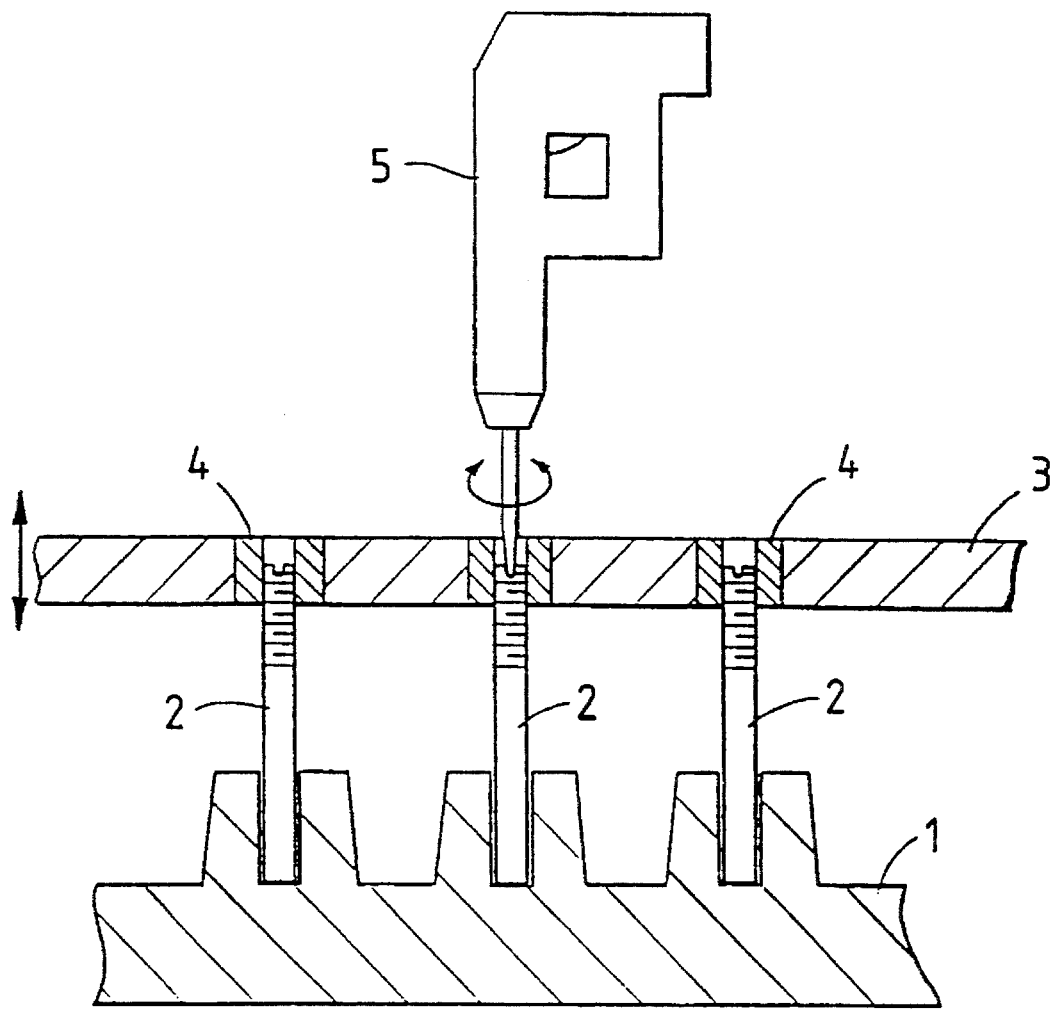
FIG. 13 is a cross-sectional view showing an example of the conventional method of construction with respect to execution of a floor board.

As shown in FIG. 2, a box wrench 14 is detachably fixed to the chuck 12 so that a nut 104 engaged with a bearing bolt 102 vertically fixed on a foundation slab 101 can be rotated. Of course, instead of the box wrench 14, a screwdriver part (bit) as shown in FIG. 13 may be attached to the chuck 12 in order to rotate the bearing bolt.

The position sensor 20 is provided with a photo detector 21 and a liquid crystal display unit 22. The photo detector 21 receives a laser beam which is horizontally emitted and rotated at a predetermined rotating speed by a level radiation beam emitting device such as an electronic level device, and the like. The photo detector is provided with a pair of wedge-shaped photo detection elements and generates a pair of corresponding photoelectric signals S1 and S2, which vary according to the positions of the laser beam traversing the photo detector 21. Such a position sensor 20 is well known, for example, through U.S. Pat. No. 4,674,870.

Figure 3:
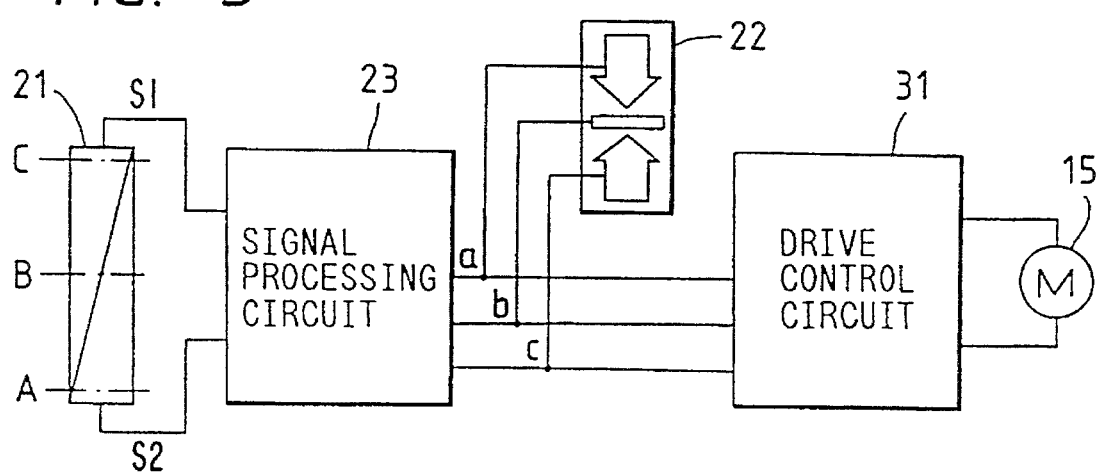
FIG. 3 is a block diagram showing electric circuits in the first embodiment.

As shown in FIG. 3, these photoelectric signals S1 and S2 are input to a signal processing circuit 23 contained in the position sensor 20. The signal processing circuit 23, having functions such as amplification, holding the peak value, comparison, and so on, processes said photoelectric signals S1 and S2, generates an output signal a to an output line when the laser beam traverses the lower edge position A of the photo detector 21, generates an output signal b to the output line when the laser beam traverses the reference position B in the middle of the photo detector 21, and generates an output signal c to the output line when the laser beam traverses the upper position C of the photo detector 21. The liquid crystal display unit 22 receives the output signals a, b and c through the output line and displays an arrow pointing downward, a bar and an arrow pointing upward corresponding to said respective output signals.

The control box 30 contains a drive control circuit 31 which receives the output signals a, b and c from said signal processing circuit 23 and controls the directions of rotation and rotating speed of the motor 15 provided in the electric driven screwdriver main body 10. The control box 30 further has red and green display lamps 32, wherein the red lamp is turned on by turning on a power source switch (not shown) and the green lamp is turned on when thread fastening operation is finished by the screwdriver.

Figure 4:
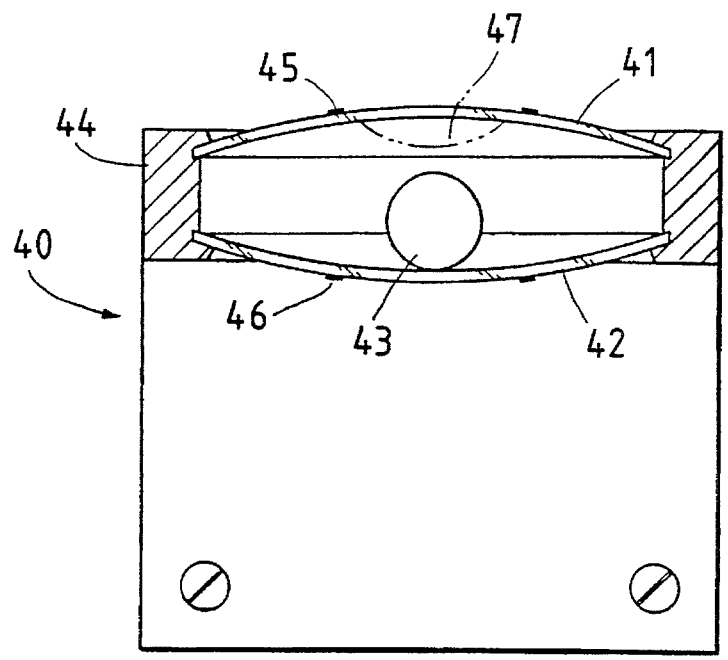
FIG. 4 is a cross-sectional view of the horizontal posture indicator.

Further, a horizontal posture indicator 40 is fixedly provided on the control box 30. As shown in FIG. 4, the horizontal posture indicator 40 consists of: a pair of upper and lower dish-shaped transparent plates 41 and 42 made of glass, plastic, or the like; a steel ball 43 put therebetween; and a frame 44 for supporting them.

Each transparent plate 41, 42 has a spherical surface with its center outwards. On the outer surfaces of the transparent plates 41 and 42, restriction circles 45 and 46 are drawn, respectively. Thus, if the electric driven screwdriver is in the posture as shown in FIG. 1, the steel ball 43 is substantially at the center of the dish-shaped transparent plate 42, as shown in FIG. 4. When the screwdriver is turned upside down, the steel ball 43, then on the inner surface of the dish-shaped transparent plate 41, is substantially at the center of the plate 41. In both cases, the electric driven screwdriver can be held substantially in the vertical posture by visually confirming the steel ball 43 being substantially at the center of the restriction circle 45 or 46. Incidentally, instead of the steel ball 43, the space between the transparent plates may be filled with liquid with a bubble 47.

Figure 5:
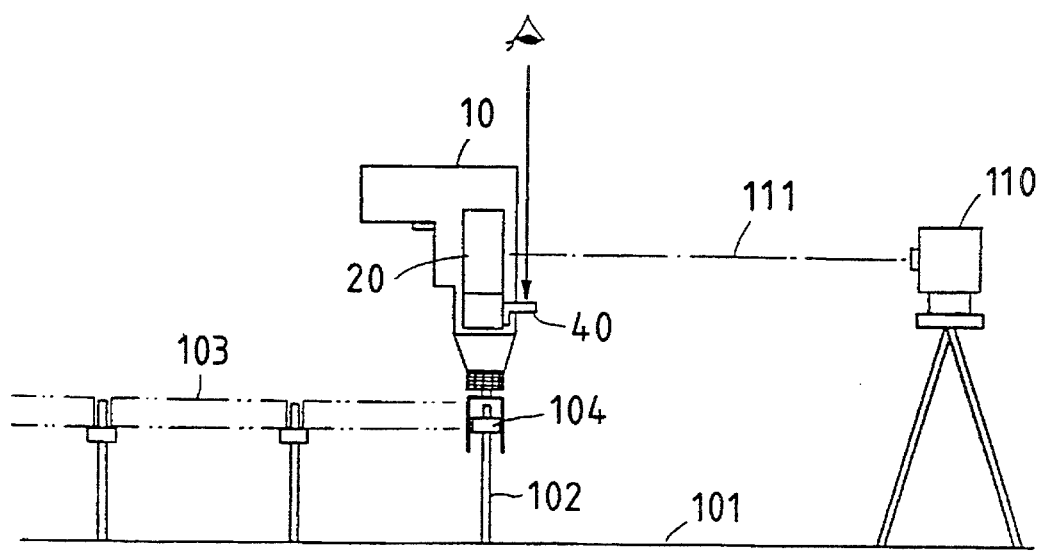
FIG. 5 is an illustration showing usage of the tool in execution of a floor board.
Figure 6:
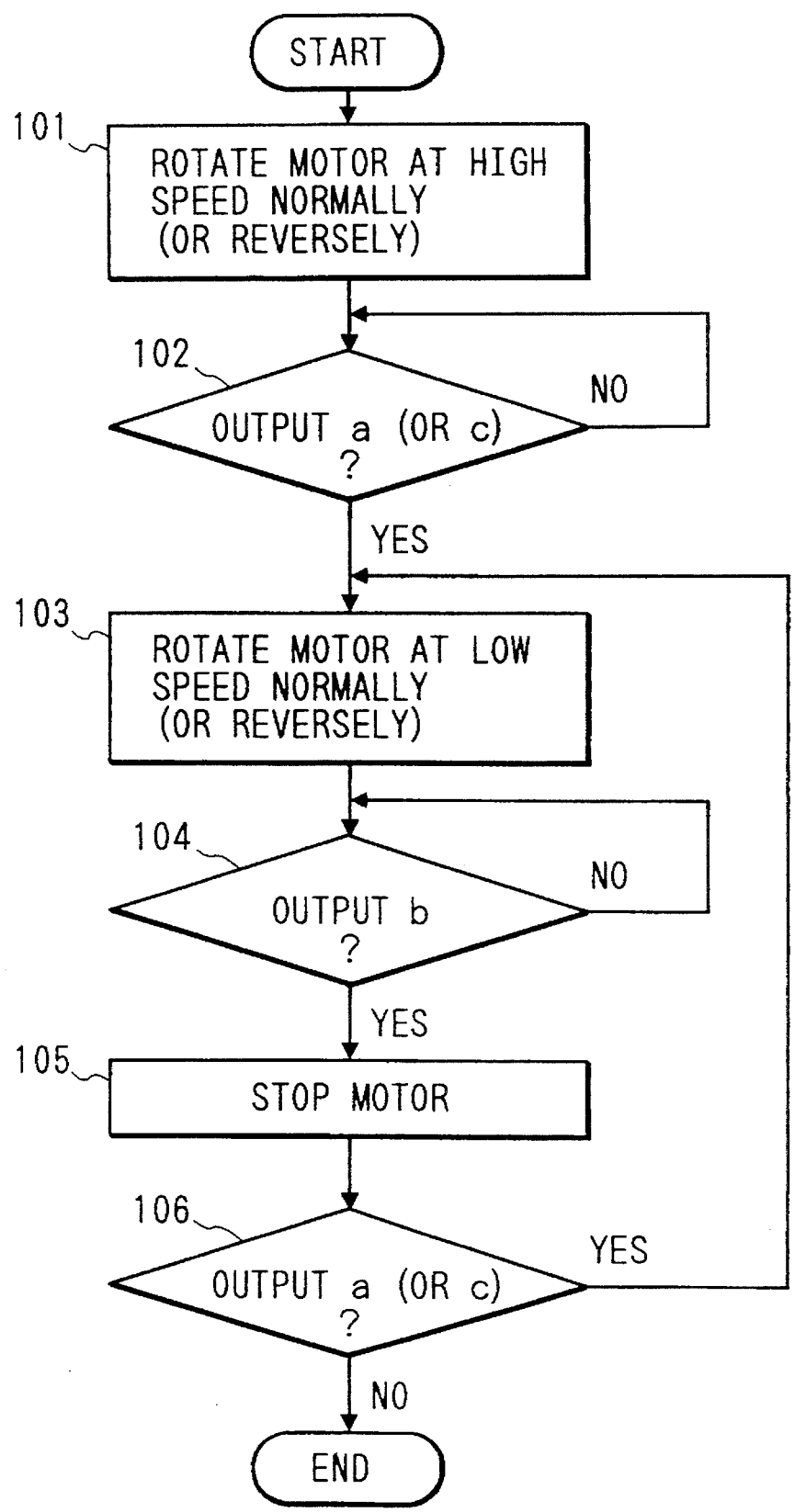
FIG. 6 is a flow chart for explaining operations of the first embodiment.

Now, procedure of execution of a floor board with the electric driven screwdriver of this embodiment will be described with reference to FIGS. 5 and 6.

On the foundation slab 101 on which many bearing bolts 102 are set up substantially vertically, a level radiation beam emitting device such as an electronic level device, or the like is provided so that a laser beam 111 is horizontally projected and rotated at a predetermined rotating speed. In case of execution of a floor board, the heights of the nuts 104 engaged with corresponding bearing bolts 102 are adjusted so as to position all the nuts 104 in the same horizontal plane.

First, the selector switch 13 for switching normal and reverse rotations is switched to the forward rotation mode, one of the nuts 104 is set in the box wrench 14, and the switch 11 is turned on. During the operation, the steel ball 43 in the horizontal posture indicator 40 should be visually checked so as to be substantially at the center of the restriction circle. Thus, the electric driven screwdriver is held substantially in the vertical posture during operation.

In the above state, as the laser beam 111 is projected below the lower edge of the photo detector 21, the photo detector 21 does not generate any photoelectric signals. Accordingly, the motor rotates at a high speed of ca. 600 rpm. As a result, the nut 104 descends according to the pitch of the thread (step S101 in FIG. 6).

As the electric screwdriver descends together with the nut, the lower edge of the photo detector 21 enters the track of rotation of the laser beam 111, when the photoelectric signals S1 and S2 (S1>S2) are output from the photo detector 21. The signal processing circuit 23 judges, on the basis of these photoelectric signals, that the beam is received at a position between A and B of the photo detector, shown in FIG. 3, and generates the output signal a to the output line. The liquid crystal display unit 22 receives the output signal a and displays the arrow pointing downwards. And the drive control circuit, when the output signal a is received, decelerates the rotating speed of the motor to one third thereof (steps S102 and S103). Thus, the nut 104 descends slowly.

When the middle of the photo detector 21 coincides with the track of rotation of the laser beam 111, said pair of photoelectric signals satisfies the equation S1=S2. Then, the signal processing circuit 23 judges that the beam is received at the position B shown in FIG. 3, and generates the output signal b to the output line. The liquid crystal display unit 22 receives this output signal b and displays the bar, and the drive control circuit 31 stops the motor (steps S104 and S105). At this time, the nut 104 has been automatically positioned at a height directed by the laser beam 111, that is, a series of thread fastening operations is finished.

If the motor can not be stopped at the moment the output signal b is generated in the output line for some reason such as torque, the track of rotation of the laser beam goes beyond the position B. In this case, said pair of photoelectric signals has a relation S1<S2. Thus, the signal processing circuit 23 judges that the beam is received at a position between B and C of the photo detector, shown in FIG. 3, and generates the output signal c in the output line. The liquid crystal display unit 22, when the output signal c is received, displays the arrow pointing upwards. The drive control circuit 31 rotates the motor reversely at low speed (steps S106 and S103), and stops the motor when the output signal b is generated again.

In the similar way, all the nuts are positioned with respect to corresponding bearing bolts. And the floor board 103 is put on these nuts as indicated the imaginary lines in FIG. 5. Thus, the floor board 103 can be set horizontally at a predetermined height directed by the laser beam 111.

Figure 7:
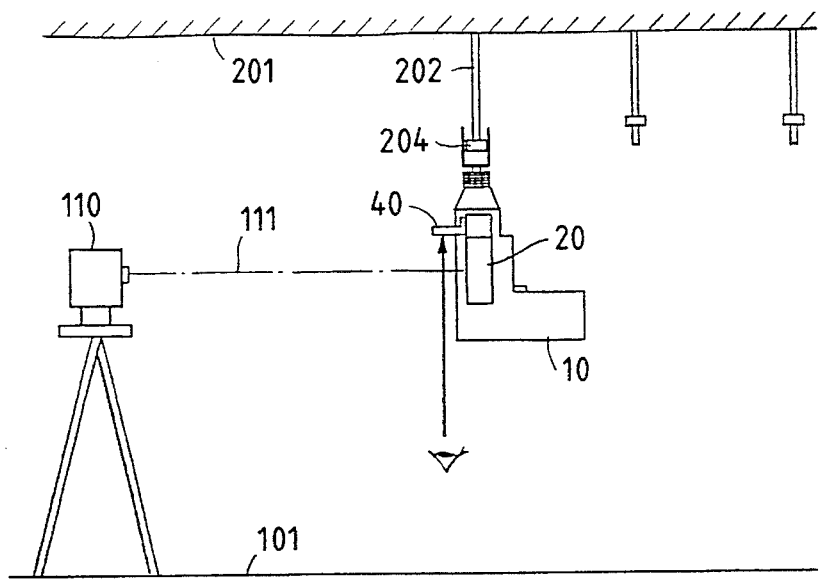
FIG. 7 is an illustration showing usage of the tool in execution of a ceiling board.

FIG. 7 shows the operation of horizontal execution of a ceiling board. In this execution, many nuts 204 are engaged with corresponding bearing bolt 202 set up substantially vertical on a ceiling foundation slab 201. Accordingly, the electric driven screwdriver is used upside down, wherein the steel ball 43 in the horizontal posture indicator 40 rolls over the inner surface of the other dish-shaped transparent plate 41. Therefore, also in this case, the operator can work while visually checking the steel ball 43 so that the steel ball is substantially at the center of the restriction circle. The procedure of execution is the same as that of execution of the floor board.

Though, in the first embodiment, the rotating speed of the motor is controlled by two stages, the rotating speed may be decelerated by multistages or continuously as the laser beam approaches the reference position, wherein the distance between the laser beam and the reference position, that is, the target, is judged by comparing said pair of photoelectric signals S1 and S2.

In the above-mentioned first embodiment, the position sensor 20 is fixed to the electric driven screwdriver 10, and the photo detector is also shifted vertically together with the screwdriver. And in the above-mentioned execution, the nuts 104 engaged with the bearing bolts 102 are rotated so that all the nuts 104 are positioned in the same horizontal plane.

But, in the execution of the floor board as shown in FIG. 13, in which the bearing bolts set up on the foundation slab are rotated to shift the floor board vertically together with the nuts, the electric driven screwdriver itself does not shift vertically even if the bearing bolts are rotated. Therefore, if the beam-emitting device 110 is installed on the foundation slab 101 as shown in FIG. 5, relative displacement between the laser beam 111 and the electric driven screwdriver can not be obtained. Even when the beam-emitting device itself is installed on the floor board which is shifted vertically, the execution of the floor board is practically impossible for the reason explained below.

Figure 8:
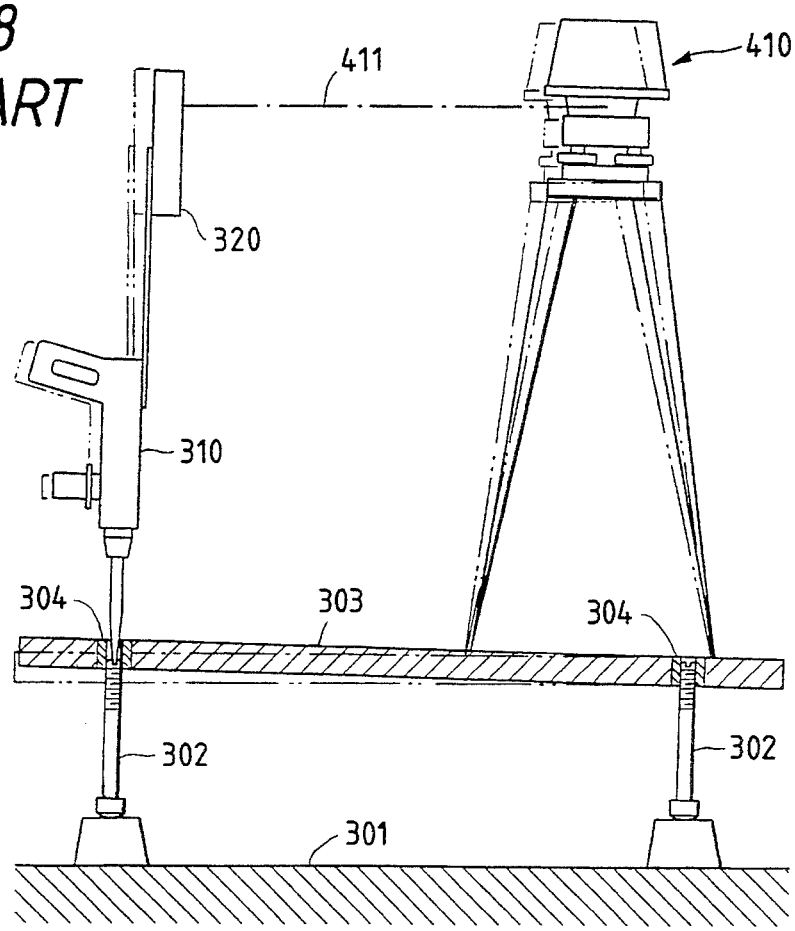
FIG. 8 is an illustration showing conventional execution of a floor board.
Figure 11:
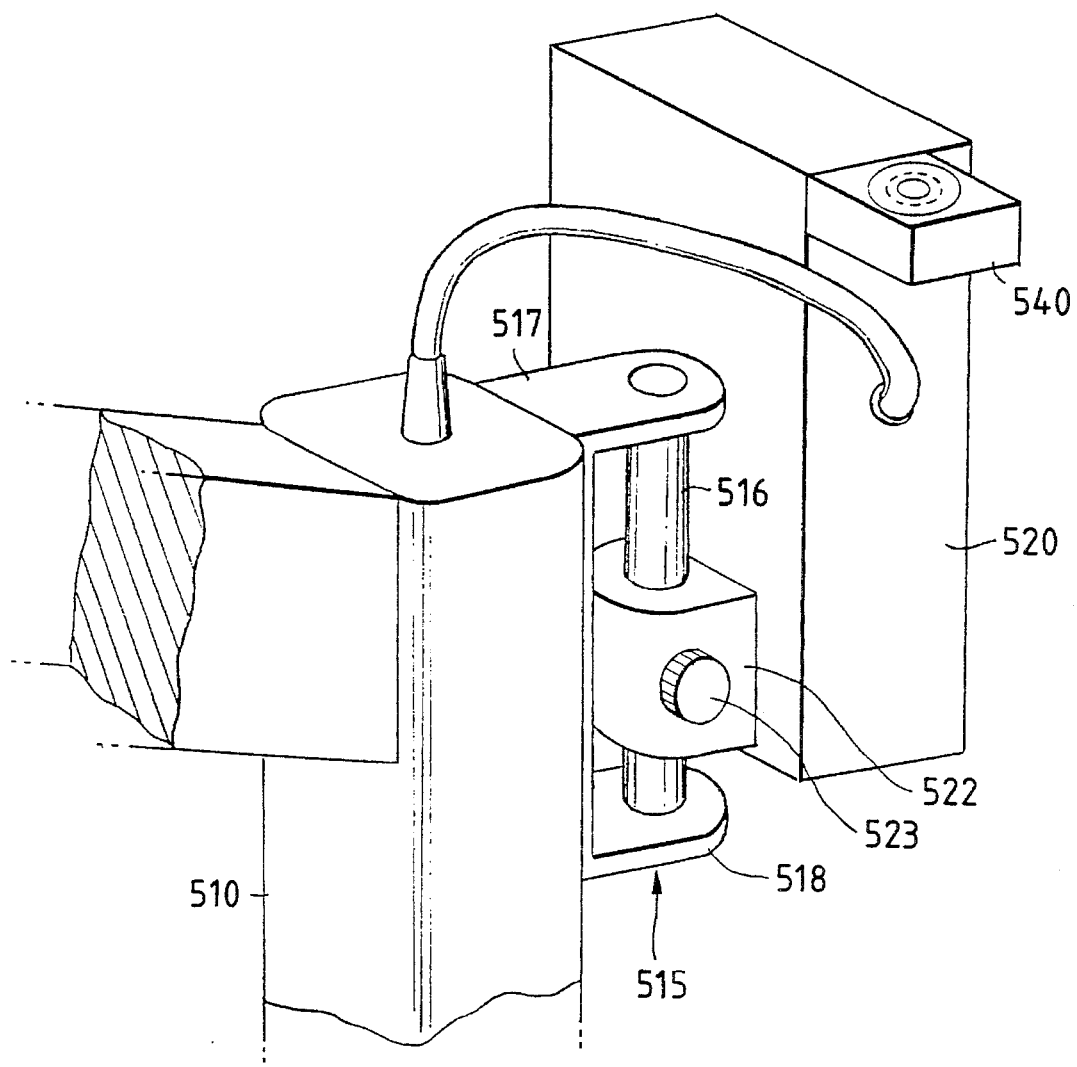
FIG. 11 is an enlarged perspective view showing main portions of the electric driven screwdriver of the second embodiment.

As shown in FIG. 8, revolvable bearing bolts 302 are provided on a foundation slab 301 and nuts 304 engaged with respective bearing bolts 302 are fixedly provided in a floor board 303. A position sensor 320 is fixed to an electric driven screwdriver main body 310. And a beam emitting device 410 set on a tripod is installed on the floor board 303.

A level radiation beam emitting device 410 such as an electronic level device is generally provided with an automatic level correction mechanism so that a laser beam 411 is always projected horizontally regardless of inclination of the housing. Accordingly, even when the floor board 303 is slanted as indicated by the solid lines in FIG. 8, the laser beam 411 emitted from the beam emitting device 410 travels horizontally. In order to horizontalize the floor board 303, the electric driven screwdriver positioned as shown in FIG. 8 is driven to rotate the bearing bolt 302. But, even when the floor board 303 is horizontalized as shown by the imaginary lines, the positional change of the laser beam 411 in the vertical direction with respect to the position sensor 320 is very little. Therefore, the photoelectric signals corresponding to the shift of the floor board can not be obtained from the position sensor 320 fixedly provided with respect to the electric driven screwdriver main body 310.

So, in the second embodiment according to the present invention, a position source provided to the electric driven screwdriver main body can be slided with respect to the main body so as to be shifted vertically together with the floor board. This second embodiment will be described below in detail with reference to FIGS. 9 to 12.

In FIGS. 9 and 10, an electric driven screwdriver main body 510 is provided with a bit 514 fixed to a chuck at the end of a drive shaft and a supporting frame 515 fixed on a side of a housing. As is shown in detail in FIG. 11, the supporting frame 515 has a guide shaft 516 whose ends are held by a pair of flanges 517 and 518.

A photo sensor 521 is provided on the front surface of the position sensor 520, while a slider 522 engaged with the guide shaft 516 is fixed to the rear surface of the position sensor 520. By means of the slider 522, the position sensor 520 and the electric driven screwdriver 510 can be shifted from each other in the direction of the drive shaft. By operating a clamp knob 523, the slider 522 can be fixed to the guide shaft 516. A horizontal posture indicator 540 which is the same as that in the above-mentioned first embodiment is fixedly provided on the upper part of the side surface of the position sensor 520. Also a supporting plate 550 is fixed to the lower part of the opposite side surface of the position sensor 520. The supporting plate 550 consists of a pair of pieces 551 and 552 fastened together with wing nuts 553, wherein the length of the supporting plate 550 is adjustable. The upper end portion of one piece 551 is fixed to the housing of the position sensor 520, while the lower end portion of the other piece 552 is bent orthogonally to form a footboard 554.

Figure 12:
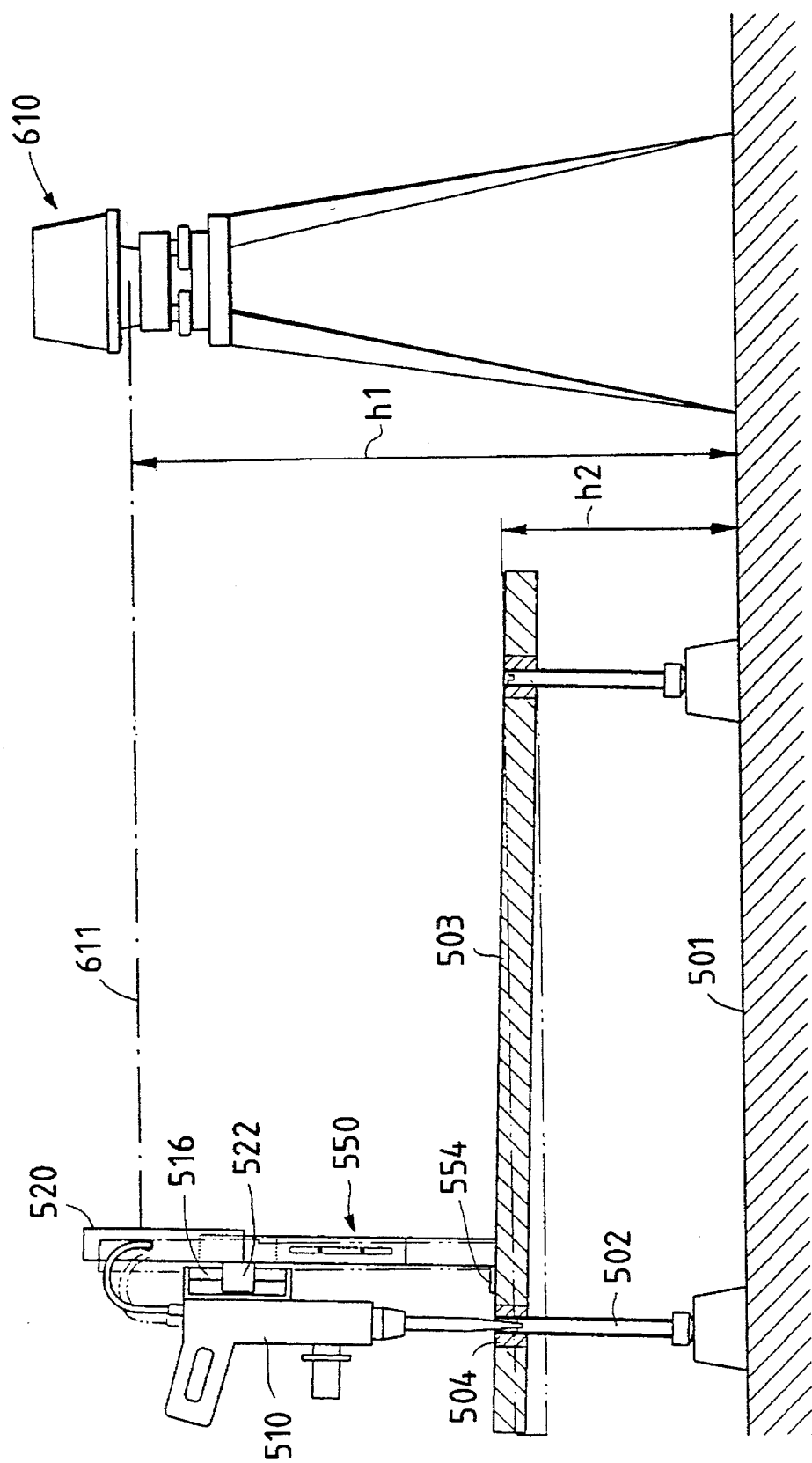
FIG. 12 is an illustration showing usage of the tool in execution of a floor board.

Procedure of execution of a floor board according to the second embodiment will be described with reference to FIG. 12.

First, the length of the supporting plate 550 is adjusted so that the length between the detection center of the photo detector 521 and the footboard 554 at the lower end portion of the supporting plate 550 becomes equal to (h1–h2), wherein h1 is the height of a laser beam 611 projected from a beam emitting device 610 from a foundation slab 501, and h2 is the planned heights of the upper surface of the floor board 503 from the foundation slab 501.

Next, the bit 514 of the electric driven screwdriver is engaged with the bearing bolt 502. And the operator treads on the footboard 554 with his or her foot to set up the supporting plate 550 and the position sensor 520 vertically. Then, verticality of the posture of the apparatus is confirmed by means of the horizontal posture indicator 540.

When a power source switch (not shown) is turned on to rotate the bearing bolt 502, the floor board 503 together with the nut 504 descends. In this case, though the electric driven screwdriver 510 stands still, the slider 522 slides along the guide shaft 516 as the floor board descends. Thus, the supporting plate 550 and the position sensor 520 descend.

When the center of the photo detector 521 gradually approaches a laser beam 611 and finally coincides with the track of rotation of the laser beam 611, a pair of photoelectric signals satisfies the equation S1=S2 as in the first embodiment and the drive control circuit stops the motor. At this time, the floor board 503 is automatically positioned at the height directed by the laser beam 611, that is, a series of thread fastening operations is finished. And the floor board 503 is horizontalized at the predetermined height as indicated by the imaginary lines in the drawing.

Incidentally, in case of executing a ceiling horizontally according to the second embodiment, the supporting plate 550 is not used. In this case, the center of the photo detector 521 is positioned by fixing the slider 522 with the cramp knob 523.

In addition, in the second embodiment, a scale 555 indicating the above-mentioned length h1–h2 may be cut in the piece 552 of the supporting plate for convenience.

What is claimed is:

1. A handheld electromotive tool, comprising:

a rotation shaft;

an electric motor to drive said rotation shaft;

a work member provided around said rotation shaft to work an object;

a housing supporting said work member and holdable by an operator;

a position transducer means including a photo detector stationary with respect to said housing, which receives a radiation beam projected in a reference plane and generates output signals indicating positional deviation of said photo detector from said reference plane; and control means for controlling the rotation speed of said motor according to said position transducer means, wherein said control means controls the motor to stop rotation of the motor when the radiation beam is received at a reference position of the photo detector, to rotate the motor at high speed until the radiation beam is received in the vicinity of said reference position, and to rotate the motor at low speed from the time the radiation beam is received in the vicinity of the reference position to the time the radiation beam is received at the reference position.

2. A handheld electromotive tool according to claim 1, wherein said control means determines the directions of rotation of said motor on the basis of said output signals and controls the motor according to the thus determined directions of rotation.

3. An electromotive took comprising:

a rotation shaft;

a work member fixed to said rotation shaft;

an electric motor to drive said rotation shaft;

a photo detector to receive a radiation beam projected in a reference plane;

a signal processing circuit to judge a position of said photo detector, at which the radiation beam is received and which shifts as said rotation shaft is driven, on the basis of art output from the photo detector;

a drive control circuit to control the rotating speed of the motor according to said position judged by said signal processing circuit, wherein said drive control circuit controls the rotating speed of the motor to stop rotating the motor when the laser beam is received at a reference position of said photo detector, to rotate the motor at high speed until the laser beam is received in the vicinity of said reference position, and to rotate the motor at low speed from a time when the laser beam is received in the vicinity of the reference position to a time when the laser beam is received at the reference position.

4. An electromotive tool according to claim 3 further comprising a handheld housing, wherein said photo detector is fixed to said housing.

5. An electromotive tool according to claim 3, wherein said drive control circuit drives said motor in the direction determined on the basis of said positions at which the beam is received.

6. An electromotive tool comprising:

a handheld housing;

a rotation shaft;

a work member fixed to said rotation shaft;

an electric motor to drive said rotation shaft;

a photo detector to receive a radiation beam projected in a reference plane;

a drive control circuit to control rotation of said motor according to output of the photo detector so that a reference position of the photo detector coincides with a position of the photo detector at which the radiation beam is received and which shifts in the direction of said rotation shaft as the rotation shaft is driven; and a posture indicator provided to said housing to indicate verticality of said rotation shaft.

7. An electromotive tool according to claim 6, wherein said posture indicator comprises: a sealed vessel whose top and bottom are sealed with a pair of transparent curved surfaces, the centers of which are convex outwards; and a medium put in said vessel which gravitates and moves along said curved surfaces.

* * * * *

UNITED STATES PATENT AND TRADEMARK OFFICE
CERTIFICATE OF CORRECTION

PATENT NO. : 5,484,026
DATED : January 16, 1996
INVENTOR(S) : Toshikazu SUSAKI et al.

It is certified that error appears in the above-indentified patent and that said Letters Patent is hereby corrected as shown below:

On cover page,

Item [56], please add the following references cited by the Examiner in his Office Action dated November 16, 1994:

| | | |
|---|---|---|
| 3,367,426 | 2/68 | Laverty |
| 3,437,156 | 4/69 | Laverty |
| 4,490,919 | 1/85 | Feist et al. |
| 4,676,634 | 6/87 | Petersen |
| 5,189,484 | 2/93 | Koschmann et al. |

IN THE CLAIMS:

Column 7, line 54, change "took" to --tool--.

Column 8, line 9, change "art" to --an--.

UNITED STATES PATENT AND TRADEMARK OFFICE
CERTIFICATE OF CORRECTION

PATENT NO. : 5,484,026
DATED : January 16, 1996
INVENTOR(S) : Toshikazu Susaki et al.

It is certified that error appears in the above-indentified patent and that said Letters Patent is hereby corrected as shown below:

Column 8, line 31, after "tool", insert --,--(comma).

Signed and Sealed this

Twenty-first Day of May, 1996

*Attest:*

BRUCE LEHMAN

*Attesting Officer*   Commissioner of Patents and Trademarks